(12) United States Patent
Maeda et al.

(10) Patent No.: US 9,669,877 B2
(45) Date of Patent: Jun. 6, 2017

(54) VEHICLE BODY FRAMEWORK STRUCTURE AND METHOD OF MANUFACTURING THE SAME

(71) Applicant: TOYOTA JIDOSHA KABUSHIKI KAISHA, Toyota-shi (JP)

(72) Inventors: Hirokazu Maeda, Nisshin (JP); Yasuhide Matsuo, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/185,125

(22) Filed: Jun. 17, 2016

(65) Prior Publication Data

US 2017/0036703 A1 Feb. 9, 2017

(30) Foreign Application Priority Data

Aug. 5, 2015 (JP) ................................ 2015-155329

(51) Int. Cl.
*B62D 25/04* (2006.01)
*B62D 29/00* (2006.01)
*B62D 27/02* (2006.01)

(52) U.S. Cl.
CPC ............ *B62D 25/04* (2013.01); *B62D 27/02* (2013.01); *B62D 29/008* (2013.01)

(58) Field of Classification Search
USPC .................. 296/187.13, 193.06, 203.01, 205
See application file for complete search history.

(56) References Cited

U.S. PATENT DOCUMENTS

| 6,279,990 B1 * | 8/2001 | Miyasaka | B62D 25/025 296/193.06 |
| 7,107,682 B2 * | 9/2006 | Hauger | B21C 37/08 29/412 |
| 9,187,135 B1 * | 11/2015 | Redmer | B62D 25/025 |
| 9,248,862 B1 * | 2/2016 | Redmer | B62D 25/04 |
| 2006/0201227 A1 * | 9/2006 | Lepre | B21C 1/24 72/370.14 |
| 2010/0013295 A1 * | 1/2010 | Spielmann | B21K 1/06 301/124.1 |
| 2011/0233961 A1 * | 9/2011 | Verbrugge | B21C 23/085 296/187.03 |

(Continued)

FOREIGN PATENT DOCUMENTS

| CA | 2691477 A1 * | 8/2010 | ............ B62D 25/04 |
| DE | 102010017658 A1 * | 1/2012 | ............ B62D 25/04 |

(Continued)

*Primary Examiner* — Jason S Morrow
(74) *Attorney, Agent, or Firm* — Oblon, McClelland, Maier & Neustadt, L.L.P.

(57) ABSTRACT

There is provided a vehicle body framework structure, the vehicle body framework structure including (1) a framework main body that is provided with a closed cross-sectional structure which is formed by joining together a first panel, and a second panel having less strength than the first panel, and (2) a cylindrical reinforcing member that is provided inside the framework main body and extends along the framework main body, a portion of the cylindrical reinforcing member that is located on the second panel side being formed thicker overall than a portion of the cylindrical reinforcing member that is located on the first panel side.

4 Claims, 4 Drawing Sheets

(56) References Cited

U.S. PATENT DOCUMENTS

2012/0256445 A1* 10/2012 Baccouche ............ B62D 25/04
                                                          296/193.06
2012/0313400 A1* 12/2012 Balzer .................... B62D 25/04
                                                          296/193.06
2016/0257345 A1*  9/2016 Hasegawa ............ B62D 25/025

FOREIGN PATENT DOCUMENTS

JP      2003-72589      3/2003
JP      2010-76763      4/2010

* cited by examiner

VEHICLE BODY FRAMEWORK STRUCTURE AND METHOD OF MANUFACTURING THE SAME

CROSS-REFERENCE TO RELATED APPLICATION

This application claims priority under 35 USC 119 from Japanese Patent Application No. 2015-155329 filed on Aug. 5, 2015, the disclosure of which is incorporated by reference herein.

BACKGROUND

Technical Field

The present disclosure relates to a vehicle body framework structure and to a method of manufacturing the same.

Related Art

A pillar structure that is provided with a front pillar having a closed cross-sectional structure formed by a pillar inner panel and a pillar outer panel, and with a cylindrical reinforcing member that is inserted inside the front pillar is disclosed in Japanese Patent Application Laid-Open (JP-A) No. 2003-72589.

In the aforementioned conventional pillar structure, for example, it is thought that the strength of the pillar outer is reduced compared to that of the pillar inner by decreasing the plate thickness of the pillar outer. In this type of structure, the objective is to achieve a reduction in weight while maintaining the overall strength of the pillar.

SUMMARY

The present disclosure provides a vehicle body framework structure that, in a vehicle body framework having a closed cross-sectional structure formed by two panels of mutually different strengths, makes it possible to efficiently improve the strength of the vehicle body framework, and to also achieve a reduction in the weight thereof, and also provides a method of manufacturing the same.

The first aspect of the present disclosure is a vehicle body framework structure that includes a framework main body which is provided with a closed cross-sectional structure which is formed by joining together a first panel, and a second panel having less strength than the first panel, and that also includes a cylindrical reinforcing member which is provided inside the framework main body and extends along the framework main body, and of which a portion that is located on the second panel side is formed thicker overall than a portion thereof that is located on the first panel side.

In the vehicle body framework structure according to the above-described first aspect, a framework main body having a closed cross-sectional structure is formed by a first panel and a second panel. The strength of the second panel is less than that of the first panel. Accordingly, a neutral axis of the framework main body (i.e., a line where, assuming that a curve exists, a neutral face where no compressive strain or tensile strain is generated, and a horizontal cross section of the framework main body intersect) is closer to the first panel side than the cross-sectional center of the framework main body.

Moreover, the cylindrical reinforcing member is provided inside the framework main body and extending along the framework main body. Accordingly, the framework main body is reinforced by the cylindrical reinforcing member, so that the strength of the vehicle body framework structure is improved.

Furthermore, the portion on the second panel side of the cylindrical reinforcing member is thicker overall than the portion on the first panel side thereof. Accordingly, a neutral face of the overall vehicle body framework structure that is obtained by joining together the framework main body and the cylindrical reinforcing member is located closer to the second panel side than the aforementioned neutral face of the framework main body. Namely, compared with a case in which the cylindrical reinforcing member has a uniform thickness, the neutral axis of the overall vehicle body framework structure can be brought closer to the cross-sectional center of the framework main body. As a result, the strength of the vehicle body framework can be improved efficiently, and a reduction in weight can be achieved.

Note that the cross-sectional center of the framework main body refers to the centroid in the drawings of an area of a horizontal cross section of the framework main body that is surrounded by the first panel and the second panel, assuming that the area has uniform density thereon.

The second aspect of the present disclosure is the vehicle body framework structure according to the first aspect, wherein a portion of the cylindrical reinforcing member that is located on the second panel side of a cross-sectional center of the framework main body is formed as an increased thickness portion, while a portion thereof that is located on the first panel side of the cross-sectional center of the framework main body is formed as a reduced thickness portion.

In the vehicle body framework structure according to the above-described second aspect, because a change is provided in the thickness of the cylindrical reinforcing member with the cross-sectional center of the framework main body being used as a point of reference, the neutral axis of the overall vehicle body framework structure can be efficiently brought closer to the cross-sectional center of the framework main body.

The third aspect of the present disclosure is a method of manufacturing the vehicle body framework structure according to the above-described first and second aspects, wherein the cylindrical reinforcing member is manufactured by preparing by means of aluminum extrusion molding a cylindrical deviated-thickness extruded raw material whose horizontal cross-sectional configuration is formed thicker in certain portions, and then molding this deviated-thickness extruded raw material using a hydroforming method.

In the method of manufacturing a vehicle body framework structure according to the above-described third aspect, a cylindrical reinforcing member is manufactured by preparing by means of aluminum extrusion molding a cylindrical deviated-thickness extruded raw material whose horizontal cross-sectional configuration is formed thicker in certain portions, and then molding this deviated-thickness extruded raw material using a hydroforming method. Namely, the vehicle body framework structure of the above-described first and second aspects can be easily manufactured.

As has been described above, the vehicle body framework structure according to the above-described first aspect makes it possible, in a vehicle body framework having a closed cross-sectional structure formed by two panels of mutually different strengths, to efficiently improve the strength of the vehicle body framework, and to also achieve a reduction in the weight thereof.

The vehicle body framework structure according to the above-described second aspect makes it possible to efficiently bring the neutral axis of the overall vehicle body framework structure closer to the cross-sectional center of the framework main body.

The method of manufacturing a vehicle body framework structure according to the above-described third aspect makes it possible to easily manufacture a vehicle body framework structure.

BRIEF DESCRIPTION OF THE DRAWINGS

Exemplary embodiments of the present disclosure will be described in detail based on the following figures, wherein.

DETAILED DESCRIPTION

Figure 1A:
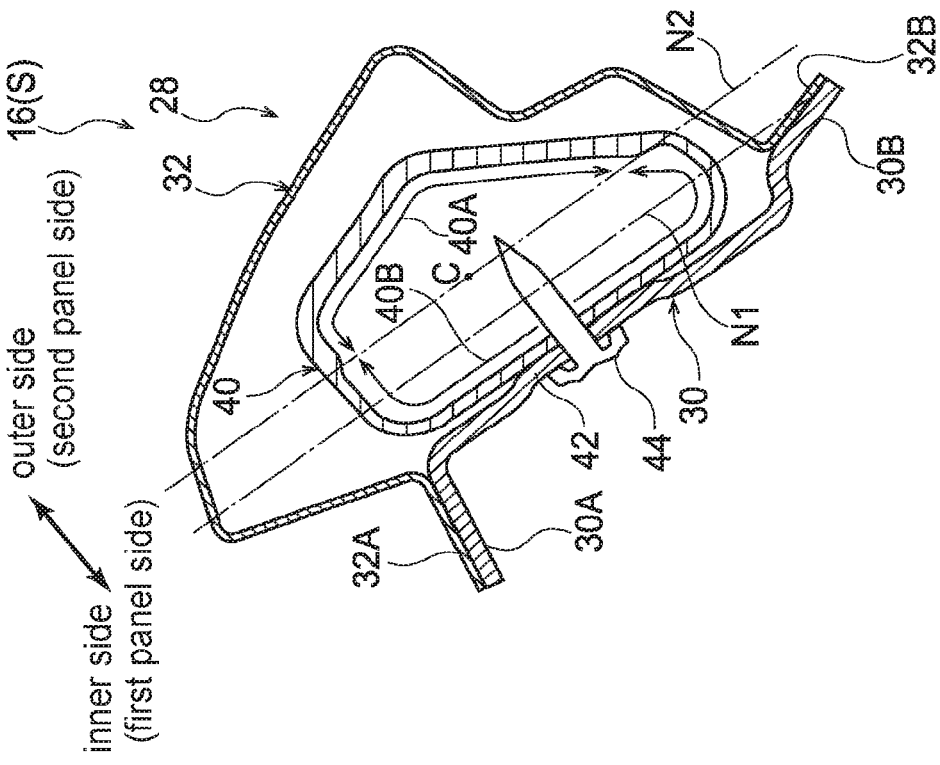
FIG. 1A shows a horizontal cross section of a front pillar upper to which a vehicle body framework structure of the present embodiment has been applied, and is a cross section taken along a line A-A in FIG. 3.
Figure 1B:
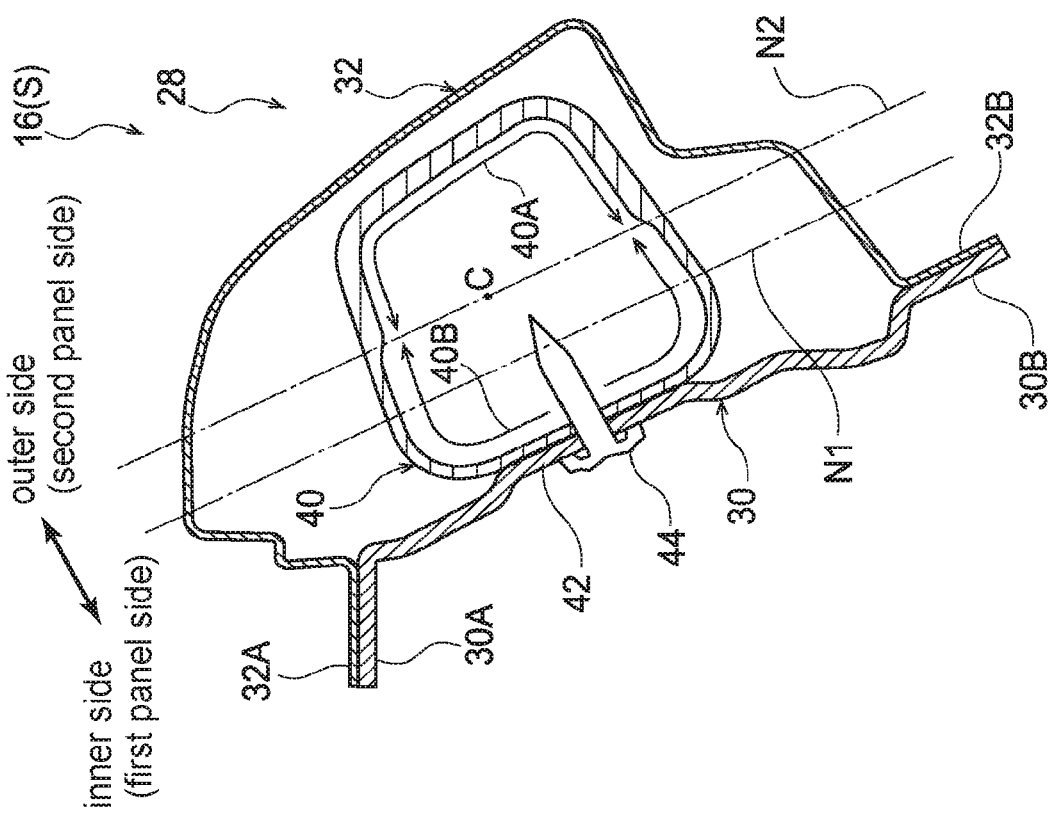
FIG. 1B shows a horizontal cross section of a front pillar upper to which the vehicle body framework structure of the present embodiment has been applied, and is a cross section taken along a line B-B in FIG. 3.
Figure 2:
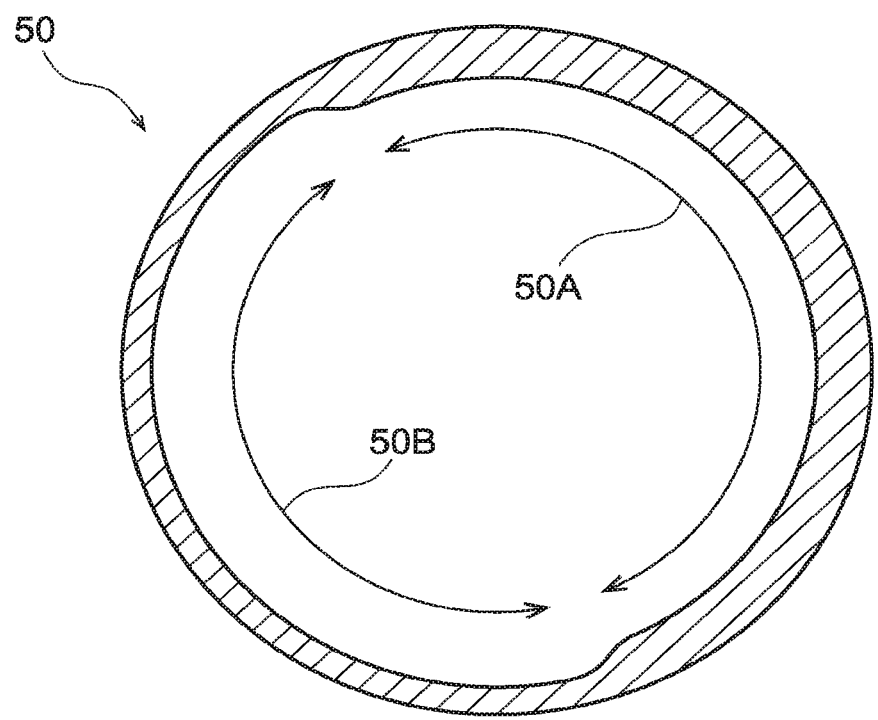
FIG. 2 is a horizontal cross-sectional view showing a deviated-thickness extruded material that forms the raw material for a cylindrical reinforcing member of the present embodiment.

Hereinafter, embodiments of the present disclosure will be described using FIG. 1 through FIG. 3. Note that an arrow FR that is shown in the drawings wherever appropriate indicates the forward side of the vehicle, while an arrow UP indicates the upper side of the vehicle. An arrow OUT indicates the exterior of the vehicle in the vehicle transverse direction.

Figure 3:
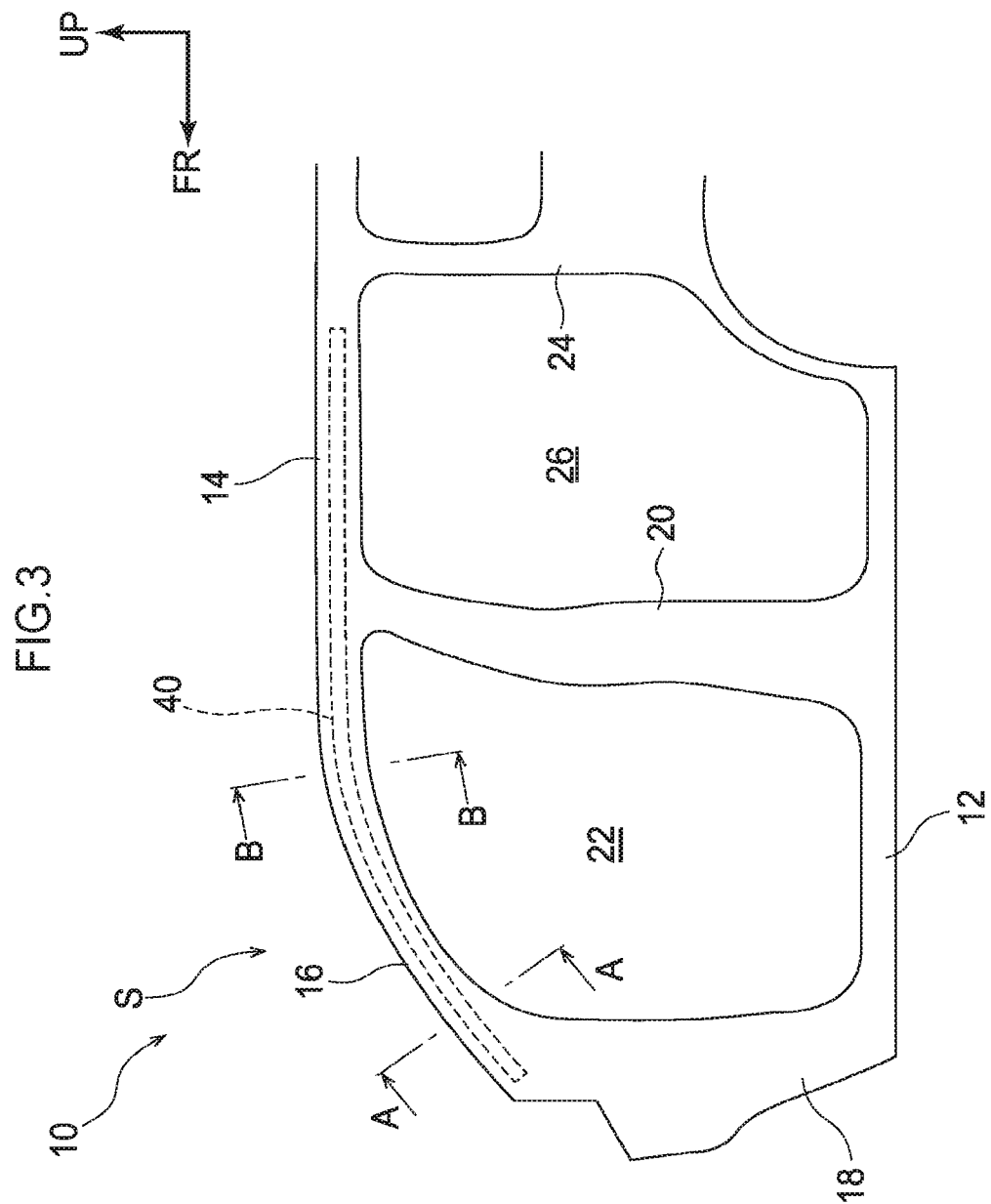
FIG. 3 is a side view showing a vehicle body side portion which is serving as an example of a portion to which the vehicle body framework structure of the present embodiment has been applied.

FIG. 3 shows a vehicle body side portion 10 (i.e., a vehicle left side portion) to a portion of which a vehicle body framework structure S of the present embodiment has been applied. As is shown in FIG. 3, a rocker 12, which is a vehicle body framework member whose longitudinal direction extends in the front-rear direction of the vehicle, is provided in a bottom portion of the vehicle body side portion 10. In addition, a roof side rail 14, which is a vehicle body framework member whose longitudinal direction extends in the front-rear direction of the vehicle, is provided in a top portion of the vehicle body side portion 10. A front pillar upper 16 that supports side ends of a front windscreen (not illustrated) and that slopes diagonally downwards toward the front of the vehicle is provided extending continuously from a front end of the roof side rail 14.

A front pillar lower 18 that extends in the vehicle vertical direction is provided so as to join a front end of the front pillar upper 16 to a front end of the rocker 12. In addition, a center pillar 20 that extends in the vehicle vertical direction is provided so as to join a rear end of the front pillar upper 16 to an intermediate portion of the rocker 12. A front side aperture portion 22 is formed by the front pillar lower 18, the front pillar upper 16, the rocker 12, and the center pillar 20. A front side door (not illustrated) that is used by a vehicle occupant to get in and out of a vehicle front seat is placed in the front side aperture portion 22. In addition, a rear side aperture portion 26 is formed by the center pillar 20, the roof side rail 14, the rocker 12, and a rear pillar 24. A rear side door (not illustrated) that is used by a vehicle occupant to get in and out of a vehicle rear seat is placed in the rear side aperture portion 26.

(Pillar Main Body)

The vehicle body framework structure S of the present embodiment is applied to an area extending from the vicinity of the front end of the front pillar upper 16 to the vicinity of the rear end of the roof side pillar 14. A horizontal cross section of the front pillar upper 16 to which the vehicle body framework structure S of the present embodiment has been applied is shown in FIGS. 1A and 1B. As is shown in these drawings, the front pillar upper 16 includes a pillar main body 28 which serves as a 'framework main body', and which has a closed cross-sectional structure. The pillar main body 28 is formed by joining together a pillar inner panel 30, which serves as a 'first panel' and forms the vehicle inner side, and a pillar outer panel 32, which serves as a 'second panel' that has less strength than the pillar inner panel 30 and forms the vehicle outer side. Note that the pillar outer panel 32 of the present embodiment is formed from steel plate material that has a smaller plate thickness than the pillar inner panel 30, and that has a low inherent strength.

Specifically, the pillar inner panel 30 and the pillar outer panel 32 are joined together by spot-welding or laser-welding or the like with respective upper flange portions 30A and 32A and respective lower flange portions 30B and 32B mutually superimposed on each other. By employing this method, the pillar main body 28 whose cross-sectional configuration is a closed cross-sectional structure is formed. The front windscreen and a roof panel (not illustrated) are placed on the upper flange portions 30A and 32A side of the pillar main body 28, while the front side door and rear side door (not illustrated) are placed on the lower flange portions 30B and 32B side thereof.

Note that the 'outer side' and the 'inner side' that are indicated respectively by arrows in FIGS. 1A and 1B respectively show the pillar outer panel 32 side and the pillar inner panel 30 side of the horizontal cross section of the pillar main body 28. Moreover, supposing that a virtual straight line (not illustrated) were drawn between the vicinity of the upper flange portions 30A and 32A, and the vicinity of the lower flange portions 30B and 32B where the respective panels are in contact with each other, then the 'pillar outer panel 32 side' and the 'pillar inner panel 30 side' refer respectively to the pillar outer panel 32 side and the pillar inner panel 30 side of a perpendicular direction relative to this virtual straight line.

Moreover, a cross-sectional center C shown in FIGS. 1A and 1B indicates the center of a cross section of the pillar main body 28. The cross-sectional center of the pillar main body 28 refers to the centroid of the area in the drawing surrounded by the pillar inner panel 30 and the pillar outer panel 32 in the horizontal cross section shown in FIGS. 1A and 1B, assuming that the area has uniform density thereon.

(Cylindrical Reinforcing Member)

A cylindrically-shaped cylindrical reinforcing member 40 is provided inside the pillar main body 28. As is shown in FIG. 3, the cylindrical reinforcing member 40 is positioned so as to extend along the longitudinal direction of the pillar main body 28 from the vicinity of the front end of the front pillar upper 16 to the vicinity of the rear end of the roof side rail 14 (i.e., to the vicinity of the rear end portion of the rear side aperture portion 26). In addition, in the horizontal cross-sectional view of the front pillar upper 16 shown in FIGS. 1A and 1B, the cylindrical reinforcing member 40 is shaped so as to surround the cross-sectional center C of the pillar main body 28.

The cylindrical reinforcing member 40 is joined to the pillar inner panel 30. Specifically, a joining surface portion 42 that is displaced towards the inner side of the pillar main body 28 is provided in the portion of the pillar inner panel 30 that is joined to the cylindrical reinforcing member 40. The joining surface portion 42 is shaped such that it can be placed in surface contact with the cylindrical reinforcing member 40, and is joined to the cylindrical reinforcing member 40 while in this state of surface contact therewith.

More specifically, the joining of the joining surface portion 42 to the cylindrical reinforcing member 40 is achieved by fusing the pillar inner panel 30 and the cylindrical reinforcing member 40, which are the welding base metals, and welding them together by means of the friction heat that is generated when a screw 44 is pushed against these base metals while being rotated at high speed (using what is known as a Flow Drill Screw—FDS (Trademark)). In this joining method, because the join can be achieved via one-sided access from the pillar inner panel 30 side, the cylindrical reinforcing member 40 can be joined easily to the pillar inner panel 30.

Moreover, the thickness of the cylindrical reinforcing member 40 changes in certain portions when seen in a horizontal cross-sectional view. Specifically, a portion of the cylindrical reinforcing member 40 that is located on the outer panel side of the cross-sectional center C of the pillar main body 28 is thicker than a portion of the cylindrical reinforcing member 40 that is located on the inner panel side of the cross-sectional center C. In other words, the portion of the cylindrical reinforcing member 40 that is located on the outer panel side of the cross-sectional center C of the pillar main body 28 is formed as an increased thickness portion 40A, while the portion of the cylindrical reinforcing member 40 that is located on the inner panel side of the cross-sectional center C of the pillar main body 28 is formed as a reduced thickness portion 40B.

Next, a method of manufacturing the cylindrical reinforcing member 40 of the present embodiment will be described.

Firstly, a cylindrical deviated-thickness extruded material 50 is manufactured by performing extrusion molding on a lightweight metal material such as aluminum or the like. Because the deviated-thickness extruded material 50 is an extruded material, it has a uniform cross section even in mutually different horizontal cross sections. However, the deviated-thickness extruded material 50 is formed so as to have what is known as a deviated-thickness cross section in each horizontal cross section. Specifically, as is shown in FIG. 2, the deviated-thickness extruded material 50 is a cylindrical member whose horizontal cross-sectional shape has an increased thickness in certain portions. Approximately half of the horizontal cross section is formed as an increased thickness portion 50A, while the remaining half is formed as a reduced thickness portion 50B. Note that, although the deviated-thickness extruded material 50 of the present embodiment has a circular cylinder shape, provided that it has a deviated-thickness cross section when viewed in horizontal cross section, it is not limited to being a circular cylinder shape, and may also be formed in another cylindrical shape.

Next, using this deviated-thickness extruded material 50 as the raw material, the cylindrical reinforcing member 40, which has mutually different cross-sectional shapes in mutually different horizontal cross sections such as a cross section taken along a line A-A in FIG. 3 and a cross-section taken along a line B-B also in FIG. 3, is manufactured by means of a hydroforming method. Specifically, the circular cylinder-shaped deviated-thickness extruded material 50 is set in a metal mold that is formed so as to enable the required cross-sectional configurations to be obtained. Next, a fluid is injected under high pressure into the interior of the deviated-thickness extruded material 50 so as to apply internal pressure thereto, and, at the same time as this, the deviated-thickness extruded material 50 is compressed in the longitudinal direction thereof. As a result, the deviated-thickness extruded material 50 expands along the length of the metal mold, resulting in the cylindrical reinforcing member 40 being formed.

As has been described above, because the deviated-thickness extruded material 50, which has a deviated-thickness cross section, is used as the raw material before the molding that is achieved via a hydroforming method, it is possible to form a cross-sectional configuration having a deviated-thickness in the cylindrical reinforcing member 40 after the molding that is achieved via a hydroforming method.

Next, the operations of the present embodiment will be described.

In the present embodiment, the pillar main body 28 which has a closed cross-sectional structure is formed by joining together the pillar inner panel 30 and the pillar outer panel 32. In addition, the pillar outer panel 32 is formed having a smaller plate thickness, and having a lower inherent strength of material than the pillar inner panel 30. Accordingly, a neutral axis N1 of the pillar main body 28 (i.e., a line where, assuming that a curve exists, a neutral face where no compressive strain or tensile strain is generated, and a horizontal cross section of the pillar main body 28 intersect) is closer to the inner panel side than the cross-sectional center C of the pillar main body 28.

Moreover, the cylindrical reinforcing member 40 is provided inside the pillar main body 28 and extending along the pillar main body 28. Accordingly, the pillar main body 28 is reinforced by the cylindrical reinforcing member 40, so that the strength of the front pillar upper 16 is improved, and the vehicle compartment space is secured.

Furthermore, in the present embodiment, the portion of the cylindrical reinforcing member 40 that is located on the outer panel side of the cross-sectional center C of the pillar main body 28 is formed as the increased thickness portion 40A, while the portion of the cylindrical reinforcing member 40 that is located on the inner panel side of the cross-sectional center C of the pillar main body 28 is formed as the reduced thickness portion 40B. Accordingly, a neutral axis N2 of the front pillar upper 16, which is provided with the pillar main body 28 and the cylindrical reinforcing member 40, is located further to the outer panel side than the above-described neutral axis N1 of the pillar main body 28 which is closer to the inner panel side. Namely, compared with a case in which the cylindrical reinforcing member has a uniform thickness, the neutral axis N2 of the overall front pillar upper 16 can be brought closer to the cross-sectional center C of the pillar main body 28. Moreover, because the changes in the thickness of the cylindrical reinforcing member 40 are provided with the cross-sectional center C of the pillar main body 28 being used as a point of reference, the neutral axis of the overall front pillar upper 16 can be efficiently brought closer to the cross-sectional center C of the pillar main body 28.

As a result, the strength of the front pillar upper 16 relative to the weight of each component can be improved efficiently, and, consequently, the necessary strength can be secured in the front pillar upper 16 at the same time as a reduction in weight is achieved.

Moreover, the cylindrical reinforcing member 40 of the present embodiment is manufactured by using a hydroforming method to mold a cylindrical raw material (i.e., the deviated-thickness extruded material 50) which has been formed with a deviated-thickness cross section via aluminum extrusion molding. In other words, the cylindrical deviated-thickness extruded material 50, whose horizontal cross-sectional configuration is thicker in some portions than in others, is prepared by means of aluminum extrusion molding, and a hydroforming method is employed to mold this deviated-thickness extruded raw material 50 into the cylindrical reinforcing member 40. Accordingly, the thicknesses of the inner panel side and the outer panel side are mutually different, and the cylindrical reinforcing member 40 whose shape conforms to that of the pillar main body 28 can be manufactured easily.

[Supplementary Description of the Above-Described Embodiment]

Moreover, in the above-described embodiment, the pillar inner panel 30 and the pillar outer panel 32 are formed by press-working a steel sheet, however, the present disclosure is not limited to this. For example, they may also be formed from an aluminum alloy sheet.

Moreover, in the above-described embodiment, the pillar outer panel 32 is formed from a steel plate having a smaller plate thickness, and having a lower inherent strength of material than the pillar inner panel 30, so that it is not as strong as the pillar inner panel 30. However, the present disclosure is not limited to this. For example, it is also possible for the pillar outer panel to be formed from a sheet material that is thinner, yet has the same inherent strength of material as the material used for the pillar inner panel. It is also possible, for example, for the pillar outer panel to be formed from a sheet material that has the same thickness, yet has a lower inherent strength of material than the material used for the pillar inner panel.

Moreover, in the above-described embodiment, the cylindrical reinforcing member 40 is formed from a lightweight metal such as aluminum or the like. However, the cylindrical reinforcing member of the present disclosure is not limited to this, and may also be formed, for example, from a steel material.

Moreover, in the above-described embodiment, the cylindrical reinforcing member 40 is manufactured by molding using a hydroforming method. However, the cylindrical reinforcing member of the present disclosure is not limited to this, and it may also be manufactured using, for example, a 3-dimensional hot bending and quench (3DQ) method. A 3-dimensional hot bending and quench method is a processing method (i.e., a heat processing method) in which 3-dimensional processing is performed on a steel material while that steel material is being quenched. More specifically, a 3-dimensional hot bending and quench method is a processing method in which, for example, a steel pipe (i.e., a pipe material) is heated in localized portions and is quenched via water-cooling, while bending processing is performed continuously on the pipe material.

Moreover, in the above-described embodiment, the cylindrical reinforcing member 40 and the pillar inner panel 30 are joined together via FDS. However, the present disclosure is not limited to this, and it is also possible to join the two together by means of, for example, another mechanical joining method, or to join them together by welding.

Moreover, in the above-described embodiment, the portion of the cylindrical reinforcing member 40 that is located on the outer panel side of the cross-sectional center C forms the increased thickness portion 40A, while the portion of the cylindrical reinforcing member 40 that is located on the inner panel side of the cross-sectional center C forms the reduced thickness portion 40B. However, the present disclosure is not limited to this, and it is also possible, for example, for only the portion of the cylindrical reinforcing member that is in contact with the pillar inner panel to have a reduced thickness, and for the remaining portions thereof to have an increased thickness. Namely, it is sufficient for the portion of the cylindrical reinforcing member that is located on the outer panel side to be thicker overall than the portion of the cylindrical reinforcing member that is located on the inner panel side. In other words, it is sufficient for the neutral axis of the cylindrical reinforcing member to be closer to the outer panel side (i.e., the second panel side) than the cross-sectional center (not illustrated) of the cylindrical reinforcing member.

Figure 4:
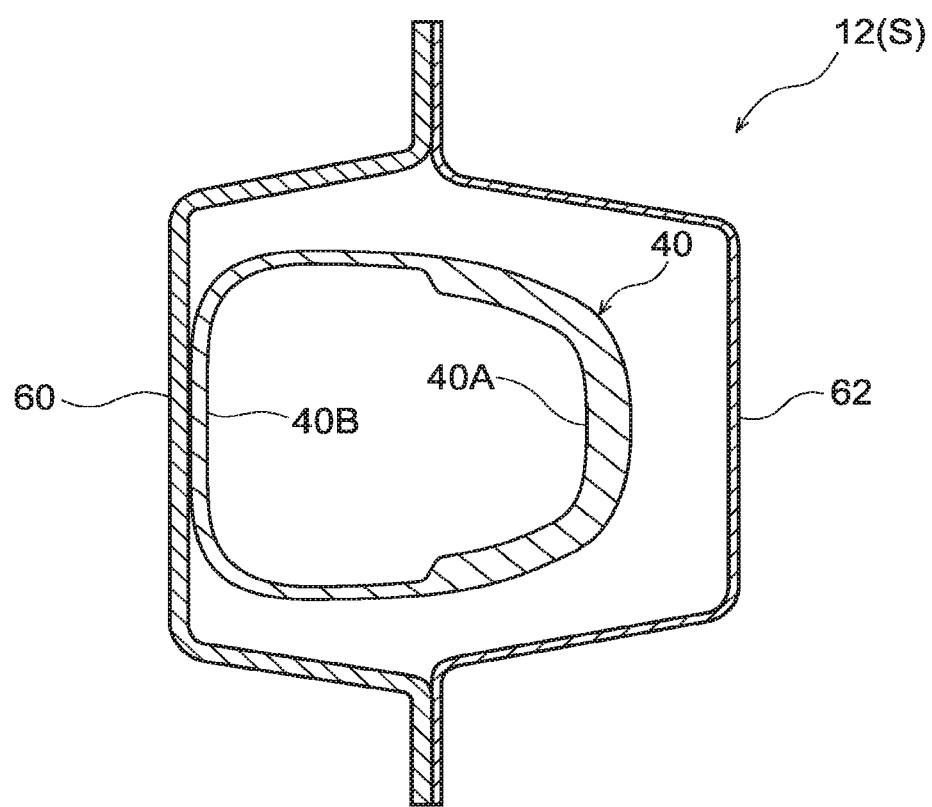
FIG. 4 is a horizontal cross-sectional view showing a rocker to which a vehicle body framework structure according to a modified example of the present embodiment has been applied.

Moreover, in each of the above-described embodiments, a form in which the vehicle body framework structure S of the present disclosure is applied to the front pillar upper 16 and the roof side rail 14 is described. However, the vehicle body framework to which the vehicle body framework structure of the present disclosure is applied is not limited to this. For example, as is shown in FIG. 4, the vehicle body framework structure of the present disclosure may also be applied to a rocker 12 that is formed so as to include a rocker inner panel 60 as the 'first panel' and a rocker outer panel 62 as the 'second panel', and it may also be applied to the center pillar 20, the front pillar lower 18, and the like. In other words, provided that the vehicle body framework structure is applied to a vehicle body framework member that has a closed cross-sectional structure formed by joining together two panels, then such a vehicle body framework structure is included in the present disclosure.

What is claimed is:

1. A vehicle body framework structure comprising:
    a framework main body that is provided with a closed cross-sectional structure which is formed by joining together a first panel, and a second panel having less strength than the first panel; and
    a cylindrical reinforcing member that is provided inside the framework main body and extends along the framework main body, a portion of the cylindrical reinforcing member that is located on the second panel side being formed thicker overall than a portion of the cylindrical reinforcing member that is located on the first panel side.

2. The vehicle body framework structure according to claim 1, wherein
    a portion of the cylindrical reinforcing member that is located on the second panel side of a cross-sectional center of the framework main body is formed as an increased thickness portion,
    a portion of the cylindrical reinforcing member that is located on the first panel side of the cross-sectional center of the framework main body is formed as a reduced thickness portion.

3. A method of manufacturing the vehicle body framework structure according to claim 1, wherein
    the cylindrical reinforcing member is manufactured by:
    preparing by means of aluminum extrusion molding a cylindrical deviated-thickness extruded raw material whose horizontal cross-sectional configuration is formed thicker in certain portions; and
    molding the deviated-thickness extruded raw material using a hydroforming method.

4. A method of manufacturing the vehicle body framework structure according to claim 2, wherein
the cylindrical reinforcing member is manufactured by:
preparing by means of aluminum extrusion molding a cylindrical deviated-thickness extruded raw material whose horizontal cross-sectional configuration is formed thicker in certain portions; and
molding the deviated-thickness extruded raw material using a hydroforming method.

\* \* \* \* \*